United States Patent
Cavagna

[19]

[11] Patent Number: 5,921,272
[45] Date of Patent: Jul. 13, 1999

[54] FLOATER DEVICE FOR CHECKING THE LIQUEFIED GAS FILLING LEVEL OF CYLINDERS OR THE LIKE

[75] Inventor: Carlo Cavagna, Calcinato, Italy

[73] Assignee: Pergola S.r.l., Ponte S. Marco di Calcinato, Italy

[21] Appl. No.: 09/047,511

[22] Filed: Mar. 25, 1998

[30] Foreign Application Priority Data

Jul. 9, 1997 [IT] Italy .................................. MI97A1638

[51] Int. Cl.$^6$ ............................. F16K 31/24; F16K 31/34
[52] U.S. Cl. ......................... 137/414; 137/444; 137/446; 141/198
[58] Field of Search .................................... 137/414, 445, 137/446, 442, 443, 444; 141/198

[56] References Cited

U.S. PATENT DOCUMENTS

| | | | |
|---|---|---|---|
| 2,143,204 | 1/1939 | McCormack | 137/414 |
| 2,588,242 | 3/1952 | Hunter | 137/414 |
| 2,767,551 | 10/1956 | Clute | 137/433 |
| 2,767,552 | 10/1956 | Clute | 137/433 |
| 4,313,459 | 2/1982 | Mylander | 137/433 |
| 5,282,496 | 2/1994 | Kerger | 137/446 |
| 5,487,404 | 1/1996 | Kerger | 137/446 |

FOREIGN PATENT DOCUMENTS 605447  6/1960  Italy ...................................... 137/446

Primary Examiner—George L. Walton
Attorney, Agent, or Firm—Guido Modiano; Albert Josif

[57] ABSTRACT

A mechanical device for checking the level to which cylinders and the like are filled with liquid gases, comprising a feeder pipe anchored to the cutoff valve unit of the cylinder. At the lower end of the pipe there are provided openings which are connected to the inside of the cylinder and in a front region there is provided a closure membrane made of flexible material and centrally provided with at least one through hole. The membrane is peripherally locked between the rim of the end of the tubular element and a hollow body which is anchored coaxially to the feeder and is provided, in an upward region, with a cavity which allows the membrane to deform correspondingly in order to directly connect the free end of the tubular feeder body to the lateral openings thereof. The hollow body has a cavity which is coaxial to the hole of the membrane and leads into a chamber in which there is provided a shutter body movable axially by means of a cam which is associated with a floating device. In this way, during the filling of the cylinder, the membrane is allowed to deform under the pressure of the gas being fed, making it flow out into the cylinder and, in small amounts, through the holes of the membrane and of the cavity of the hollow body. In the same way, once the level has been reached, the floater is allowed to arrange the cam so that the shutter can close the end of the hollow body, so as to allow the membrane to move to a stable closure position on the end of the feed pipe by means of the counterpressure generated by the gas that acts on different areas of the two opposite sides of the membrane.

4 Claims, 4 Drawing Sheets

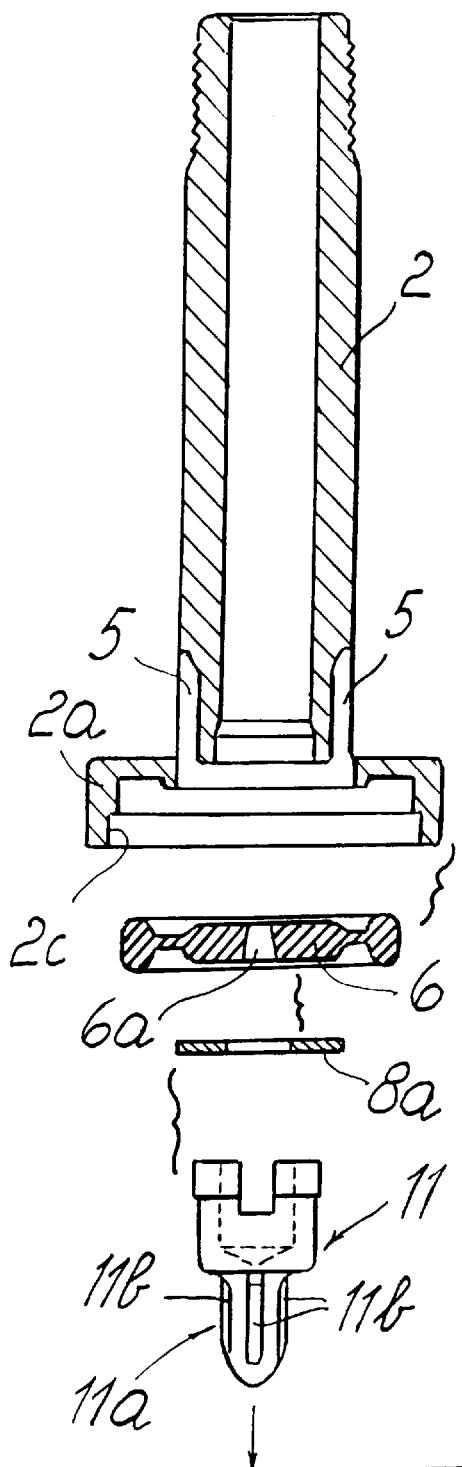
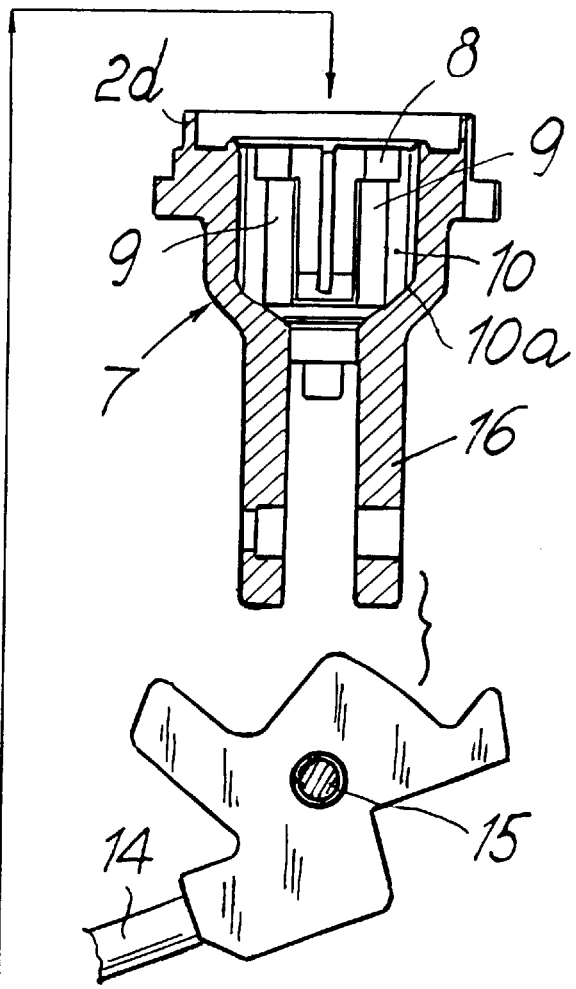
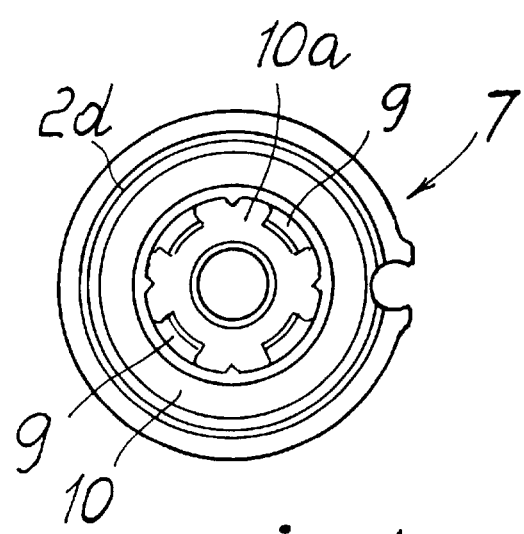
Fig. 1
Fig. 1a

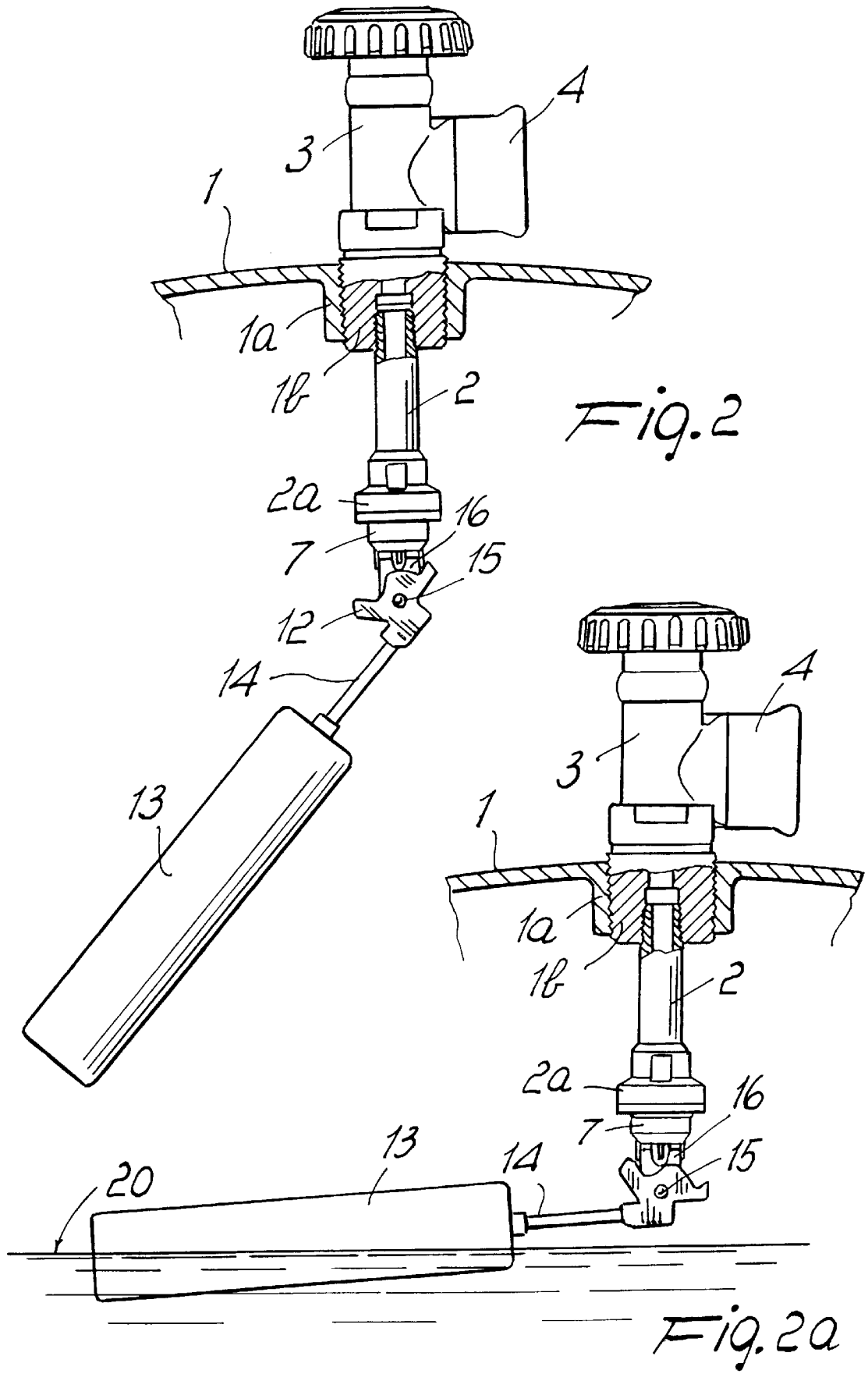

FLOATER DEVICE FOR CHECKING THE LIQUEFIED GAS FILLING LEVEL OF CYLINDERS OR THE LIKE

BACKGROUND OF THE INVENTION

The present invention relates to a mechanical floater device for checking the level to which containers, such as cylinders and the like, are filled with pressurized liquefied gases.

Many gases are usually sold in the liquid state in metal containers which have a high resistance to internal pressure and are generally known as pressurized liquefied gas cylinders.

Moreover, it is known that filling of these cylinders entails using particular equipment and the need to perform filling up to a level which is generally between 80 and 85% of the actual capacity of the cylinder. If the maximum intended filling level is exceeded, when the external temperature increases a dangerous condition may arise because the mass of the liquid increases and the pressure inside the container can exceed the intended strength values.

In order to obviate this drawback, measurement devices have already been devised which can be inserted in the cylinder with the purpose of checking its filling level, but so far they have not had reliable success in practical use. On the other hand, the filling degree of liquid gas cylinders must be kept at a very specific level with respect to the capacity of the cylinder for obvious reasons which are mainly safety-related.

SUMMARY OF THE INVENTION

Accordingly, the aim of the present invention is to provide a mechanical device for checking the filling level of cylinders for liquefied gases which is conceived so as to obviate the drawbacks and disadvantages of conventional systems for checking the amount of product fed into each empty cylinder and which, most of all, is highly reliable and operates automatically and quickly.

Within the scope of this aim, an object of the present invention is to provide a device for checking the level of liquid gas fed into a cylinder which is structurally simple, quickly insertable in conventional cylinders, safe and durable in operation, and quite inexpensive.

Another object of the present invention is to provide a checking device of the above-specified type which may be produced with common and easily available materials and with simple and inexpensive production methods.

This aim, these objects and others which will become apparent hereinafter are achieved by a mechanical device for checking the level to which cylinders and the like are filled with liquid gases kept at high pressure, said device being constituted, according to the present invention, by a straight tubular feeder body anchored coaxially to the central outlet of the cylinder and directed inside said cylinder, the upper end thereof being connected, with a conventional cutoff valve interposed, to the coupling outlet provided both for feeding the gas into the cylinder and for sending said gas to the user device, channel-shaped lateral openings being provided at the lower end of said tubular element and being connected to the inside of the cylinder, a closure membrane or diaphragm being provided frontally, being made of flexible material and being centrally provided with at least one through hole, said membrane being peripherally locked between the annular rim of the end of said tubular element and a hollow cylindrical body anchored coaxially to said tubular feeder and provided, in an upward region, with an annular flared region which allows said membrane to deform correspondingly in order to directly connect the free end of the tubular feeder body to the lateral openings thereof, the tubular cavity of said hollow body being coaxial to the hole of said membrane and leading into a chamber, a shutter body being arranged loosely and so that it is guided centrally to said chamber, said shutter body being movable axially by contact with a cam which is associated with a floating device, so as to allow, during the filling of the cylinder, the membrane to deform under the pressure of the gas being fed, making it flow out mainly into the cylinder and, in small amounts, through the holes of the membrane and of the cavity of said hollow body, and so as to then allow, once the level has been reached, the floater and the cam associated therewith to allow said shutter to be arranged in a closing position on the end of the cavity of the hollow body, so as to allow said membrane to return to a stable closure position on the end of the feeder element by means of the counter-pressure generated by the gas that acts on different areas of the two opposite sides of the membrane.

More particularly, the shutter is constituted by a cylindrical body guided peripherally by protrusions formed longitudinally on the hollow body so as to allow outflow of the gas released from the central hole of the membrane through the tubular cavity of the hollow body.

Moreover, the end portion of the shutter is guided, in a downward region, again in the hollow body and has grooves designed to allow the outflow of the gas when the shutter is kept raised, with respect to the sealing seat, by the actuated cam.

BRIEF DESCRIPTION OF THE DRAWINGS

Further characteristics and advantages of the device according to the present invention will become apparent from the following detailed description thereof, given with reference to the accompanying drawings, which are provided merely by way of non-limitative example and wherein:

FIG. 1 is an exploded sectional view of the set of the structural elements that compose the checking device according to the present invention;

FIG. 1a is a top view, showing only the element shaped like a hollow body illustrated in FIG. 1;

FIGS. 2 and 2a are side views of the device for checking the level of the gas inside a cylinder, shown respectively assembled and in the loading position and assembled condition but in the closed position;

DISCLOSURE OF THE PREFERRED EMBODIMENTS

Figure 3:
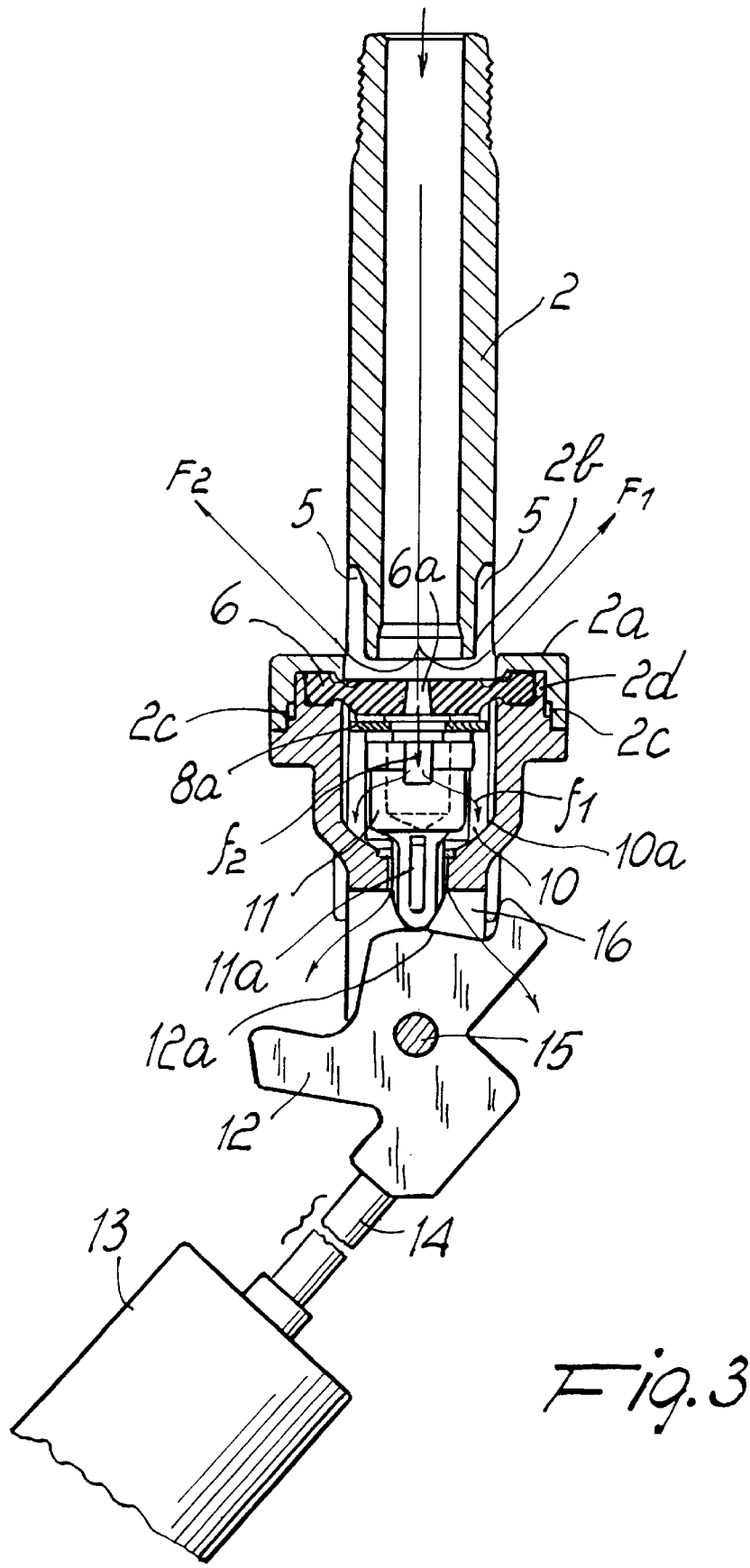
FIGS. 3 and 4 are axial sectional views of the device of FIGS. 2–2a which is shown, respectively, in the position for filling a cylinder and in the closed position when the level is reached.

With reference to the above figures, the device for checking the filling level of a conventional cylinder 1 (FIG. 2) is substantially constituted by a straight tubular body 2 coaxially anchored to an outlet 1a of the cylinder 1 by means of a threaded coupling 1b or suitable means; its upper end is connected, with a conventional cutoff valve 3 interposed, to a tubular coupling 4 usually provided for feeding the liquid gas into the cylinder and for connection to the user device (FIGS. 2–2a).

The tubular body 2, located inside the cylinder, ends in a downward region with a first cylindrical expansion 2a which is substantially a portion of a sleeve that allows to form an annular chamber 2b which is coaxial to the pipe 2 (FIGS. 3 and 4); said first expansion 2a then continues with a second expansion 2c which is larger than the first one and whose function will become apparent hereinafter.

In the cylindrical wall of the first expansion 2a there are provided wide through openings 5, substantially grooves, which connect the annular chamber 2b to the inside of the cylinder 1, while for opening and closing the ends of the feed pipe 2 and of the annular chamber 2b there is provided a disk-shaped membrane 6 made of flexible material which is provided with a central hole 6a having a small diameter. The hole 6a can have, for example, a frustum-like shape, in which the smaller end face is directed towards the pipe 2. The membrane 6 is peripherally locked between an annular recess, formed within the inner surface of the expansion 2c, and the edge 2d of a hollow cylindrical body 7 located below, which is rigidly coupled to the tubular body 2 by welding or other suitable means.

The upper face of the hollow body 7 is recessed, so as to have a first cavity 8 provided with a seat for a washer 8a which is coaxial to the central hole 6a of the flexible membrane 6. A cylindrical chamber 10 is formed between the underlying face of the washer 8a and the lower hollow part of the hollow body 7 and is provided with axial ridges 9 whereon the washer 8a rests. A shutter body 11 is fitted, so that it can move axially, inside the cylindrical chamber 10 and is provided in a downward region with a stem 11a on which equidistant ridges 11b are formed. The ridges 9, in addition to guiding the shutter, also allow the passage of the fluid that arrives from the hole 6a of the membrane (FIG. 3) through the narrower portion 10a of the cylindrical chamber 10 during the filling of the cylinder, as shown by the arrows F1 and F2 of FIG. 3.

A cam 12 cooperates with the stem 11a of the shutter 11 and is connected to a floater 13 by means of a rod 14 and to the hollow body 7 through a pivot 15 which allows it to rotate according to the position assumed by the floater 13 in relation to the level of the liquid inside the cylinder. The pivot 15 is supported by a fork-shaped portion 16 which is rigidly associated with the lower part of the hollow body 7.

Operation of the above-described level checking device can be summarized as follows.

Figure 4:
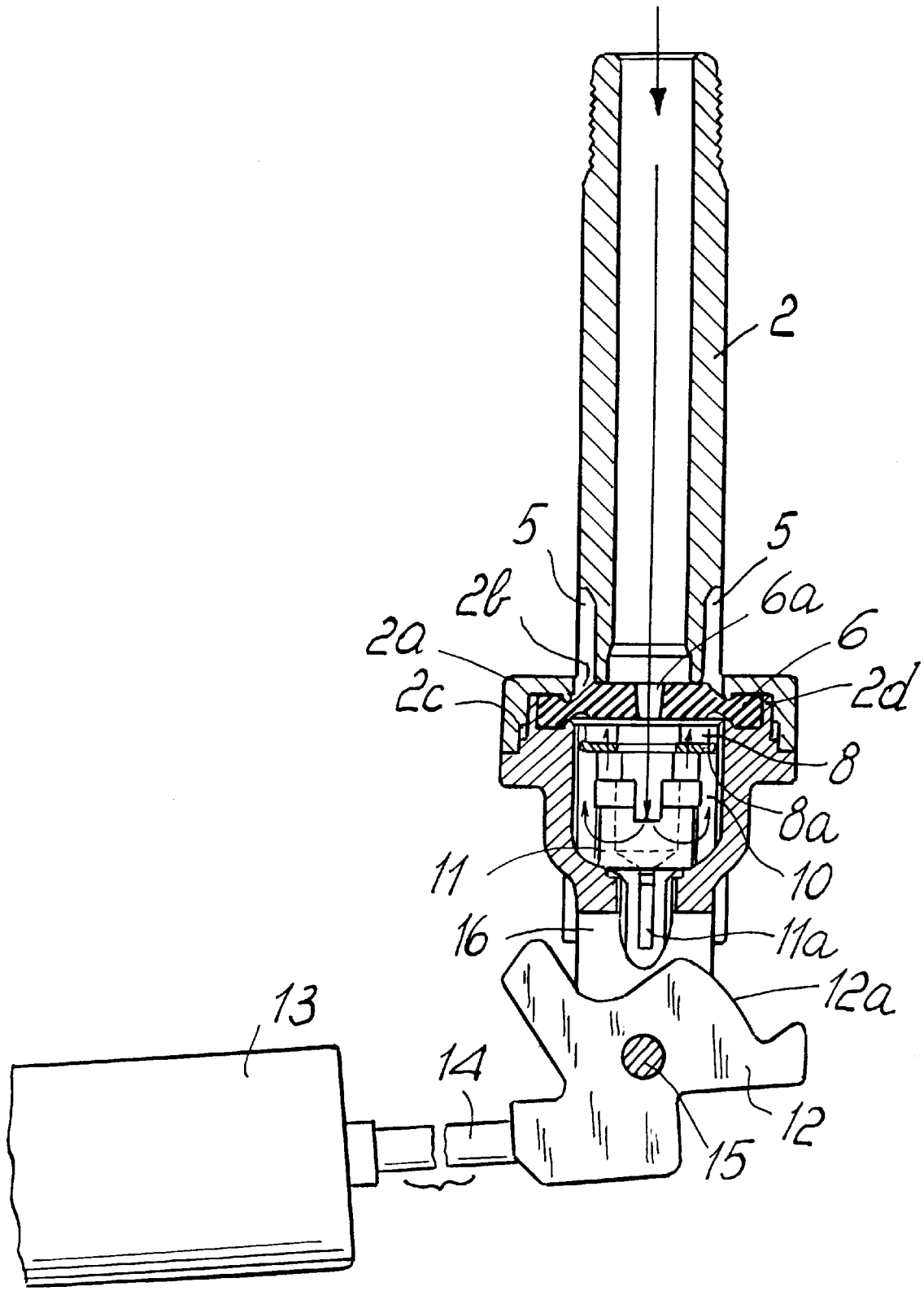

After anchoring the feed pipe 2 to the valve unit of an empty cylinder 1 for liquid gases, the pressurized gas introduced in the pipe 2 through the external coupling 4 pushes the flexible membrane 6 downward, into the space delimited by the washer 8a installed in the hollow body 7; the deformation of the membrane, as shown in FIG. 3, entails the separation of its peripheral part from the rim of the end of the pipe 2, as shown by the arrows F1–F2 of said FIG. 3, so that the gas rises in the annular interspace 2b and exits from the openings 5, being thus distributed inside the cylinder. Simultaneously, the same stream of gas passes through the central hole 6a of the membrane and through the ducts 10 and 10a. The stream of gas can enter the cylinder by virtue of the position of the cam, wherein the protruding part 12a keeps the shutter 11 in the open position, i.e., retracted into the hollow body 7.

When the level of the gas reaches the preset value, for example the level designated by 20 in FIG. 2a, the floater 13 has moved into the position shown in FIG. 2a, and at the end of its stroke the rod 14 has moved the cam 12 into a position which allows the shutter 11 to move downward. The shutter closes, with its base, the duct 10a by contact against the lower opening of the hollow body 7.

As a consequence of the closure of the duct 10a, the gas arriving from the feed duct with a pressure that is higher than the pressure inside the cylinder accumulates inside the chambers 8 and 10 and presses above and below the membrane 6, since its hole 6a is open. However, since the cross-section of the feed pipe 2 affects an area of the membrane that is smaller than the area below the membrane, which is also subjected to the same pressure that acts above, the membrane is subjected to a counterpressure which automatically returns it to the closed position against the feed pipe 2 and keeps it stably in said position. At this point, the valve unit 3 can be closed and the connection of the coupling 4 to the feed duct can be removed. The nonhermetic closure achieved by the shutter 11 by contact against the lower opening of the duct 10a allows, after the closure of the valve unit 3, to quickly restore an equilibrium between the pressure inside the cylinder and the pressure that acts on the membrane 6.

The hole 6a formed in the membrane 6 allows to dispense the gas contained in the cylinder in an amount which is sufficient to feed the user devices until the contents are depleted.

From the above description it is evident that the intended aim of being able to check the level of the gas accurately, eliminating the drawbacks due to the inevitable differences in filling that are observed when filling is performed with conventional systems, has been achieved.

The invention as described and illustrated is of course susceptible of structurally and functionally equivalent modifications and variations, including the materials employed, without abandoning the scope of the protection of the invention.

What is claimed is:

1. A mechanical device for checking the level to which cylinders and the like are filled with pressurized liquid gases, comprising a tubular feeder body anchorable coaxially to a central outlet of the cylinder and directed inside said cylinder such that a lower end of a liquid gas conduit of said tubular feeder body is arranged inside said cylinder for feeding liquid gas through said liquid gas conduit out of said lower end of said liquid gas conduit and into said cylinder, an upper end of said tubular feeder body being connectable, with a conventional cutoff valve interposed, to a coupling outlet provided both for feeding the gas into the cylinder through said liquid gas conduit and for sending said gas to a user device, lateral openings, constituted substantially by grooves, being provided at a lower end of said tubular element adjacent said lower end of said liquid gas conduit and being connected inside the cylinder when said tubular feeder body is anchored to the central outlet of the cylinder and being connected with the lower end of said liquid gas conduit for feeding liquid gas through said liquid gas conduit out of said lower end of said liquid gas conduit and through said lateral openings and into said cylinder, said lateral openings being formed in a lower wall portion of said tubular feeder body and extending upwardly from said lower end of said liquid gas conduit above said lower end of said liquid gas conduit such that liquid gas is fed out of said lower end of said liquid gas conduit and through said lateral openings where the liquid gas is fed in a direction extending upwardly from said lower end of said liquid gas conduit into the cylinder and upwardly away from an upper surface of liquid gas contained in the cylinder, a closure membrane or diaphragm being provided frontally, being made of flexible material and being centrally provided with at least one through hole, said membrane being peripherally locked between a rim of the end of said tubular element and a hollow body anchored coaxially to said tubular feeder and provided, in an upward region, with a cavity which allows said membrane to deform correspondingly in order to directly connect the free end of the tubular feeder body to the lateral openings thereof, said hollow body having a first tubular cavity which is coaxial to the hole of said membrane and leads into a cylindrical chamber, a shutter body being arranged loosely and so that it is guided centrally to said chamber, said shutter body movable axially by means of a cam which is associated with a floating device, so as to allow, during the filling of the cylinder, the membrane to deform under the pressure of the gas being fed, making it flow out mainly into the cylinder and, in small amounts, through the holes of the membrane and of the cavity of said shutter body, and so as to then allow, once the level has been reached, the cam to allow said shutter to be arranged in a closing position on the end of the cylindrical cavity of the hollow body, so as to allow said membrane to return to a stable closure position on the end of the feeder element by means of the counterpressure generated by the gas that acts on different areas of two opposite sides of the membrane.

2. The device according to claim 1, wherein inside said hollow body there are provided longitudinal protrusions adapted to guide said shutter and to allow the outflow of the gas released through the tubular cavity of said hollow body.

3. The device according to claim 1, wherein said shutter is constituted by a cylindrical body peripherally provided with grooves in its final part in a longitudinal direction, so as to allow guiding thereof and the outflow of the gas released through the tubular cavity of said hollow body.

4. The device according to claim 1, wherein said cam that allows the axial movement of said shutter is hinged in a downward region to a fork-like element which is rigidly coupled to the hollow body and is connected, at one end, to a floating body.

* * * * *